ns. For the purpose of the present invention,

3,051,627
STABILIZED CHYMOTRYPSIN SOLUTION

Paul E. Bradford, Kankakee, Charles W. Damaskus, La Grange, and James B. Lesh, Flossmoor, Ill., assignors, by mesne assignments, to Armour-Pharmaceutical, a corporation of Delaware
No Drawing. Filed Aug. 18, 1960, Ser. No. 50,302
7 Claims. (Cl. 195—63)

This invention relates to the stabilization of chymotrypsin, and more particularly to an aqueous solution of chymotrypsin which is characterized by being substantially stable under ordinary conditions of commercial use. The invention also relates to the stabilization of chymotrypsin in the form of a dry powder.

The present application is related to pending application Serial No. 669,927, filed July 5, 1957, now U.S. Patent No. 2,978,385.

It has long been known that chymotrypsin tends to be unstable and to become progressively inactivated when dissolved in aqueous solutions. Such inactivation proceeds quite rapidly under refrigeration as well as at room temperature, so it has not heretofore been possible to manufacture and sell chymotrypsin in the form of an aqueous solution. Such aqueous solutions, however, have definite advantages for both topical and parenteral applications, but heretofore the doctor has been required to prepare such solutions as needed from crystalline or lyophilized chymotrypsin. Even when chymotrypsin is in the form of a dry powder, and has been prepared by lyophilization or similar procedure, deterioration and loss of activity may occur on prolonged storage.

It is therefore the general object of this invention to provide a substantially stabilized aqueous solution of chymotrypsin wich is satisfactory for commercial manufacture and sale. Such aqueous solutions of chymotrypsin have therapeutic utility in the treatment of certain forms of asthma, bronchitis, rhinitis, and sinusitis, as well as in the treatment of certain dermatological conditions such as leg ulcer and ringworm. More recently, the value of chymotrypsin in conjunction with cataract extractions has been shown. Some clinical applications of aqueous solutions of chymotrypsin are illustrated in the following publications: Cornbleet et al.: Use of Chymotrypsin in Dermatology, Antibiotic Medicine and Clinical Therapy, vol. 6, pp. 21–24; Parsons: Asthma, Bronchitis, Rhinitits, and Sinusitis Adjunctive Treatment With Intramuscular Chymotrypsin, Clinical Medicine, vol. 5, pp. 1491–1494; and Thorpe: Chymotrypsin an Aid to Intracapsular Cataract Extractions, Tr. Am. Ophth. Soc. (1959), vol. 57, pp. 254–289.

This invention is based in part on the discovery that non-sulfhydryl and non-disulfide containing amino acids have a marked stabilizing action on chymotrypsin in aqueous solution. This action is manifested at a concentration of as low as .5% (wt./vol.). Preferably, however, the aqueous chymotrypsin solution contains from 2 to 10% of the amino acid, optimal stabilization being obtained within the range from 4 to 6%. Particularly good results are obtained with glycine, methionine, and valine either individually or in combination with each other. Other amino acids which can be used to accomplish some of the objects of this invention are threonine, serine, proline, hydroxy-1-proline, and tryptophane.

Speaking more generally, as little as 0.5 part by weight of such amino acids can be used per part of chymotrypsin to achieve improved stability of the chymotrypsin. Under certain conditions, as when the chymotrypsin is in the form of a dry powder, as much as 15 parts by weight of the amino acid stabilizer can be combined with the chymotrypsin. With lyophilized chymotrypsin from 5 to 12 parts by weight of threonine or similar amino acid are particularly desirable.

In practicing the present invention, we prefer to use a substantially pure chymotrypsin starting material, that is, crystalline chymotrypsin or amorphous chymotrypsin of greater than 95% purity. Crystalline chymotrypsin can be prepared as described by Northrop, et al., Crystalline Enzymes (2nd Ed., 1948). The principal chymotrypsin described in the cited reference is usually designated as the alpha form of chymotrypsin, but the reference also describes the preparation of beta and gamma chymotrypsins. For the purpose of the present invention, the alpha form of chymotrypsin is preferred.

The concentration of the chymotrypsin in the aqueous solution is not particularly critical, but for most purposes within the scope of the present invention it will fall within the range from 1 to 10 milligrams of chymotrypsin per cubic centimeter of water. Our preferred formulations contain from 4 to 6 mg./cc. The proteolytic activity of the chymotrypsin may be measured by the homoglobin substrate method (see J. Gen. Physiology, vol. 22, p. 79), and when so measured will average at least 1000 activity units per milligram. A standard of potency by this method has been set up in terms of "Armour Units" (A.U.), as described in U.S. Patent No. 2,871,165.

In preparing the aqueous solution, it is desirable to use pyrogen free distilled water, since for pharmaceutical use the final preparations should be sterile and should be free of any toxic contaminants. To achieve the benefits of the present invention, the pH of the solutions must be on the acid side. Generally, a pH ranging from 3.5 up to 6.0 is suitable, but a pH below 5.0 is preferred for maximum effect of the stabilizer. A pH within the range from 3.7 to 4.3 usually will given optimum results. Various non-toxic acids such as hydrochloric acid, acetic acid, and the like, can be used to make the necessary pH adjustment. The chymotrypsin solutions may also advantageously contain a preservative agent like merthiolate, parabens or phenol.

In practicing the method of this invention, the sulfhydryl and disulfide free amino acids or mixtures of such amino acids may be used as the sole stabilizing agent. This is preferred when the chymotrypsin is in the form of a dry powder for storage and shipment. It has been found desirable to also include a calcium salt in the aqueous solution, unless the solution is to be used in a few hours. The calcium salt employed should be water soluble and non-toxic. Various calcium salts may be employed to provide a cooperative or synergistic effect with the amino acid, such as calcium gluconate, calcium chloride, calcium lactate, calcium levulinate, etc. The preferred calcium salt, however, is calcium acetate, as described in copending application, Serial No. 669,927, filed July 5, 1957. The concentration of the calcium salt may range from .05 to 2%. In the case of calcium acetate, the preferred concentration range is from .15 to .25%.

The present invention is further illustrated by the following specific examples.

EXAMPLE 1

A pharmaceutically useful solution of chymotrypsin was prepared from substantially pure alpha chymotrypsin having a potency of about 1100 A.U./cc. After the preparation of the solution according to Formula 1 as set out below, the solution was sterile filtered and vialed in 5 cc. vials.

*Formula 1*

| | |
|---|---|
| Chymotrypsin (alpha form) | 5.0 mg./cc. (5500 A.U./cc.). |
| Sodium chloride | 0.9%. |
| Glycine | 5.0%. |
| Merthiolate | 0.01%. |
| P.F. (pyrogen free) distilled water | Q.s. |
| pH (adjusted with acetic acid), 4.0. | |

The vials of chymotrypsin solution prepared as just described were subjected to an accelerated shelf life test, being heated at 45° C. The results are shown below in Table A.

TABLE A

| Hours: | Potency (A.U.) |
|---|---|
| 0 | 6240 |
| 8 | 5800 |
| 48 | 5260 |
| 90 | 5340 |

EXAMPLE 2

The preparation of Example 1 was subjected to further stability tests at various temperatures and for prolonged periods of time with the results summarized in Table B.

TABLE B

| Time (Wks.) | Temperature (°C.) | Potency (A.U./cc.) |
|---|---|---|
| Initial | | 6,000 |
| 1 | 45 | 4,040 |
| 2 | 32 | 5,520 |
| 4 | 37 | 4,770 |

EXAMPLE 3

A further series of preparations were prepared as described in Example 1, except that the concentration of glycine was varied from 0% to 5% and in each solution .22% calcium acetate was included. Five solutions in all were prepared at glycine concentrations of 0%, .5%, 1.0%, 2.5% and 5%. The general formula of these preparations is set out below as Formula 2:

*Formula 2*

| | |
|---|---|
| Chymotrypsin (alpha form) | 5.0 mg./cc. (5500 A.U./cc.). |
| Sodium chloride | 0.9%. |
| Calcium acetate (as hydrate, $2H_2O$) | 0.22%. |
| Glycine | 0 to 5%. |
| Merthiolate | 0.01%. |
| P.F. distilled water | Q.s. |
| pH (adjusted with acetic acid), 4.0. | |

Accelerated shelf life tests were carried out at 45° C. with the preparations just described. The potency of the solutions at the start was approximatley 5500 A.U./cc. After heating the solutions for 90 hours at 45° C., the control sample (0% glycine) then dropped to 2600 A.U./cc., while the solutions containing 5% glycine showed substantially the same activity (5000–5500 A.U./cc.). The other samples all had activities ranging from 3500 for the sample containing .5% glycine to around 4000–4300 A.U./cc. for the other samples.

EXAMPLE 4

The preparation of Example 3 was subjected to further stability tests at various temperatures and for prolonged periods of time with the results summarized in Table C:

TABLE C

| Time (Wks.) | Temperature (°C.) | Potency (A.U./cc.) |
|---|---|---|
| Initial | | 5,900 |
| 1 | 45 | 4,560 |
| 2 | 32 | 5,800 |
| 4 | 37 | 5,000 |

EXAMPLE 5

The following amino acids were added at a 2% concentration to an aqueous solution containing 5 mg./cc. (5500 A.U./cc.) of alpha chymotrypsin and 0.01% merthiolate. The pH of all samples was adjusted to 4.0 with acetic acid. A control sample of chymotrypsin in pyrogen free distilled water with 0.01% merthiolate at a pH of 4.0 was also prepared. The control sample assayed 5580 A.U./cc. initially and after 1 week at 45° C. the sample assayed 1940 A.U./cc. The results with the other samples are summarized below in Table D.

TABLE D

| Amino acid: | Activity after 1 week at 45° C., A.U./cc. |
|---|---|
| dl-Threonine | 3930 |
| dl-Valine | 3820 |
| dl-Serine | 3760 |
| l-Proline | 3760 |
| dl-Methionine | 3600 |
| Hydroxyl-l-proline | 3590 |
| Glycine | 3570 |

EXAMPLE 6

A 3% concentration of dl-tryptophane was substituted for the glycine in the formula of Example 1. This preparation was heated at 45° C. for 48 hours. The potency at the start was around 5500 A.U./cc., while at the end of the 48-hour heat treatment it was still around 4800–5000 A.U./cc.

EXAMPLE 7

Lyophilized alpha chymotrypsin is intimately mixed with threonine to improve the stability characteristics of the chymotrypsin for prolonged storage. For example, 5 mg. of threonine may be used per 750 A.U., and the product packaged in 6 ml. vials.

While in the foregoing specification certain specific embodiments of the present invention have been set forth for purpose of illustration, it will be understood that the invention is susceptible to other embodiments and that certain of the details set forth herein can be varied considerably without departing from the basic principles of the present invention.

We claim:

1. A stabilized preparation of alpha chymotrypsin characterized by containing from 0.5 to 15 parts by weight of an amino acid in its free acid form, said free amino acid being selected from the group consisting of glycine, methionine, valine, threonine, serine, proline, and mixtures thereof.

2. An alpha chymotrypsin preparation in the form of a dry powder, said preparation containing alpha chymotrypsin in admixture with an amino acid in its free acid form, said amino acid being selected from the group consisting of glycine, methionine, valine, threonine, serine, proline, and mixtures thereof, from 5 to 12 parts by weight of said amino acid being present per part of said alpha chymotrypsin.

3. A substantially stabilized aqueous solution of alpha chymotrypsin characterized by containing from .5 to 10% of an amino acid in its free acid form, said free amino acid selected from the group consisting of glycine, methionine, valine, threonine, serine, proline, and mixtures thereof, said solution being at a pH from 3.5 to 6.0 and having a concentration of alpha chymotrypsin ranging from 1 to 10 mg./cc.

4. A substantially stabilized aqueous solution of alpha chymotrypsin characterized by containing from 0.5 to 10% of an amino acid in its free acid form, said free amino acid being selected from the group consisting of glycine, methionine, valine, threonine, serine, proline, and mixtures thereof, said solution being at a pH of 3.5 to 5.0 and having a concentration of alpha chymotrypsin ranging from 1 to 10 mg./cc.

5. A substantially stabilized aqueous solution of alpha chymotrypsin characterized by containing an amino acid in its free acid form, said free amino acid being selected from the group consisting of glycine, methionine, valine, threonine, serine, proline, and mixtures thereof, said amino acid being present in a concentration of from 4 to 6%, said solution being at a pH of from 3.5 to 5.0 and having a concentration of said alpha chymotrypsin ranging from 4 to 6 mg./cc.

6. The aqueous solution of claim 5 in which said amino acid is glycine.

7. A chymotrypsin preparation in the form of a dry powder, said preparation containing alpha chymotrypsin in admixture with threonine, and from 5 to 12 parts by weight of said threonine being present per part of said alpha chymotrypsin.

References Cited in the file of this patent
UNITED STATES PATENTS

| | | |
|---|---|---|
| 2,806,815 | Singher et al. | Sept. 17, 1957 |
| 2,887,435 | Witty et al. | May 19, 1959 |
| 2,930,736 | Sullivan et al. | Mar. 29, 1960 |